No. 802,950. PATENTED OCT. 24, 1905.
I. G. WATERMAN.
ELECTROMAGNETIC VALVE.
APPLICATION FILED AUG. 29, 1903.
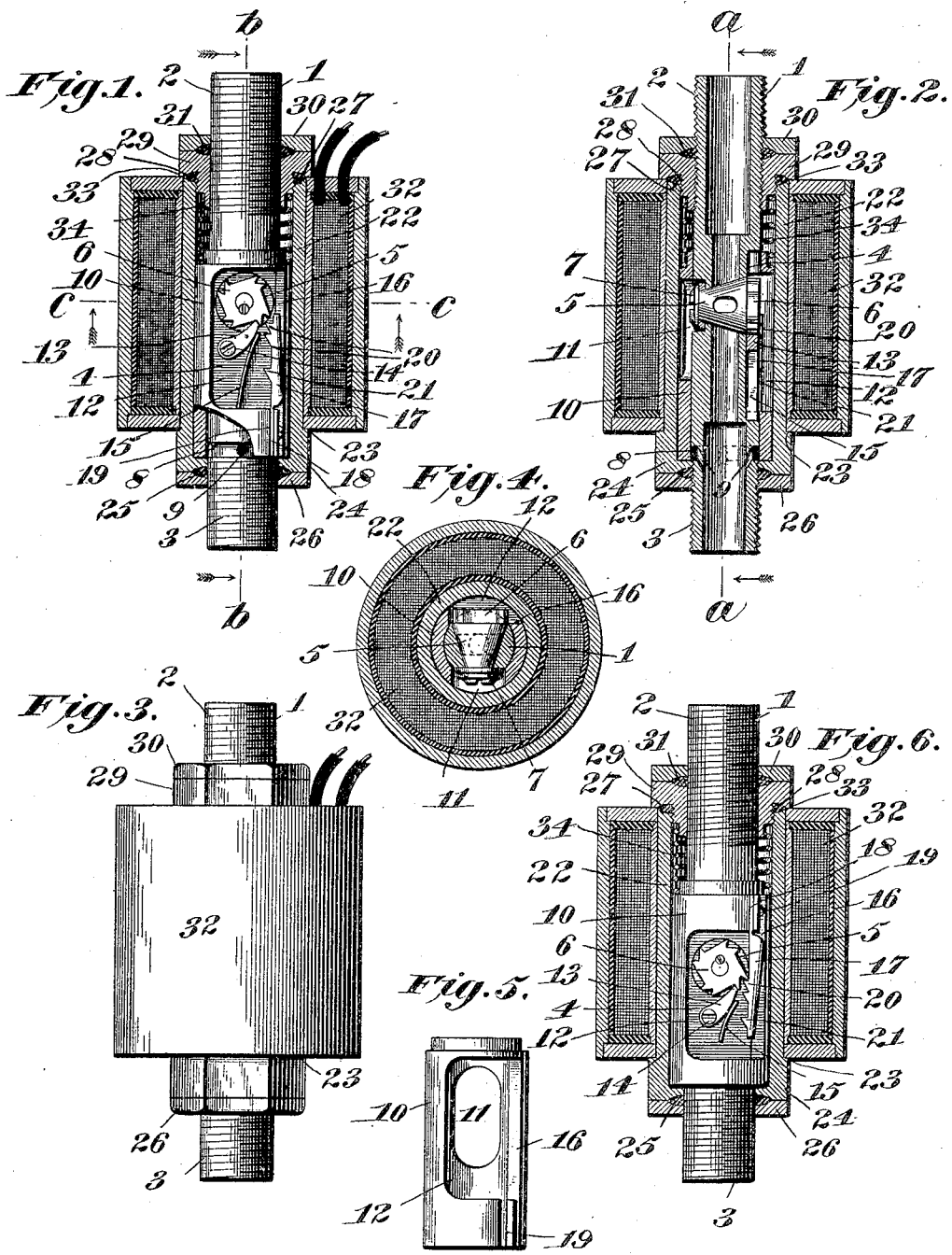
Witnesses
Elmer Leavey
Wallace R. Leavey
Inventor
Isaac G. Waterman
by Geo. A. Shuler
his Attorney

UNITED STATES PATENT OFFICE.

ISAAC G. WATERMAN, OF SANTA BARBARA, CALIFORNIA.

ELECTROMAGNETIC VALVE.

No. 802,950. Specification of Letters Patent. Patented Oct. 24, 1905.

Application filed August 29, 1903. Serial No. 171,215.

*To all whom it may concern:*

Be it known that I, ISAAC G. WATERMAN, a citizen of the United States, residing at Santa Barbara, in the county of Santa Barbara and State of California, have invented new and useful Improvements in Electromagnetic Valves, of which the following is a specification.

This invention relates to electromagnetic valves.

The object of the present invention is to provide improvements on the electromagnetic valve set forth in my application filed July 9, 1903, Serial No. 164,888, and with this end in view I aim to simplify the construction, render it compact, insure reliability of action in opening and closing of the valve, provide for the protection of the magnet coil or solenoid against any leakage which might take place around the valve, and generally to provide a simple, durable, and efficient electromagnetic valve employing but one solenoid which is adapted on alternate electrical energizations to open and close the valve.

Having the foregoing objects in view the invention consists of those features of construction and novel combinations of parts set forth in detail hereinafter and embodied in the appended claims.

In the accompanying drawings, Figure 1 is a vertical section on line *a a* of Fig. 2; Fig. 2, a vertical section on line *b b* of Fig. 1; Fig. 3, a side elevation; Fig. 4, a horizontal section on line *c c* of Fig. 1; Fig. 5, a side view of the armature; and Fig. 6, a modification wherein the pawl pulls upon the ratchet-wheel of the valve instead of pushing it, as in the other figures.

The numeral 1 designates a tube or pipe-section adapted to be coupled at its opposite screw-threaded ends 2 and 3 to the supply and discharge water-pipes. In other words, the pipe-section 1 is interposed in an ordinary water-pipe and water enters at 2 and flows out at 3. One side of this pipe-section 1 is flattened at 4, and extending diametrically through the pipe-section is a rotary plug-valve 5, having secured to its larger end a ratchet-wheel 6, with the teeth thereof disposed in pairs, while a screw and washer 7 are secured to the smaller end of the valve. The pipe-section 1 is provided with an annular groove 8, from which inclined ducts or ports 9 lead to the interior of the pipe-section 1, provision being thereby made so that if any water leaks out at either end of the valve it will pass down the pipe-section 1 and be caught in the groove 8 and pass through the ports 9 into the pipe-section again, thereby preventing any accumulation of water which would tend to enter the coil or solenoid.

Slidable on the tube or pipe-section 1 is a tubular iron armature 10, having cut-out portions 11 and 12 in its opposite sides, the cut-out portion 11 receiving the screw and washer 7 and preventing any turning of the armature on the tube or pipe section 1, and the cut-out portion 12 being adapted to receive the ratchet-wheel 6 and a dog 13, pivoted at 14 to the flat portion 4 of the tube or pipe section 1, and a leaf-spring 15, which is secured to the tube 1 and holds the dog in engagement with the teeth of the ratchet-wheel, said dog preventing backward movement of the ratchet-wheel and valve. The armature is provided with the longitudinal cut-away portion 16, in which lies a pawl 17, secured by leaf-spring 18 to the armature at 19. This pawl has a pair of teeth 20, adapted to engage the pairs of teeth on the ratchet-wheel, and is also provided with a locking-tooth 21 to engage a succeeding pair of teeth on the ratchet-wheel after the valve has been turned and when the armature is at the limit of its movement, to thereby prevent any further accidental turning of the valve. The arrangement of the ratchet-wheel, the pawl, and the dog prevents any turning of the armature on the tube or pipe 1.

Surrounding the armature and the pipe-section or tube 1 is a tube or shell 22, which is provided with a shoulder 23 and is secured on the screw-threaded end 3 and has a cupped portion 24, in which is packing 25, held by a nut 26. The other end of the tube 22 is cupped at 27 and receives packing 28, which is held by a nut 29, screwed on the threaded end 2. A nut 30 is screwed on the end 2, and packing 31 is interposed between this nut and the nut 29. Provision is thereby made to guard against any leakage of the water. Surrounding the tube 22 is an iron-clad coil or solenoid 32, which is held against longitudinal movement by shoulders 23 and 33.

The numeral 34 designates a coil-spring interposed between the nut 29 and the upper end of the armature and located in the tube or shell 22, the tendency of which is to normally keep the armature down.

In the modification shown in Fig. 6 the construction is the same as that heretofore described with the exception that the pawl is secured to the opposite end of the armature and exerts a pulling effect on the ratchet-wheel when the solenoid is energized instead of the pushing effect of the construction shown in the other figures.

The parts are normally in the position shown. When an electrical current is sent through the coil or solenoid, the armature is drawn thereinto, and the teeth on the pawl are made to engage with a pair of teeth of the ratchet-wheel, and the parts are so apportioned that the plug-valve is turned a quarter-revolution to either open or close the valve, as the case may be. When the coil is deënergized, the spring returns the armature to normal position and the pawl rides idly over the ratchet-wheel, the dog 13 meanwhile locking the ratchet-wheel against backward movement, so that the position of the valve is not disturbed. On again energizing the coil the operation is repeated and the valve turned another quarter-revolution to open or close it, as the case may be. When the armature is attracted by the coil and after the ratchet-wheel has been turned by the teeth on the pawl, the locking-tooth 21 comes between the members of the pair of teeth on the ratchet-wheel succeeding the pair engaged by the pawl, and thereby prevents too far turning of the ratchet-wheel and valve.

The valve is intended to be operated by the utilization of a momentary or temporary current of electricity, and any of the temporary contact-switches set forth in my Patents Nos. 775,016, 775,052, 775,053, and 775,055, dated November 15, 1904, can be used for operating the valve.

If desired, the tube or shell 22 might be filled with oil to prevent leakage of water from the valve into the solenoid. If this is done, the groove 8 and ducts 9 would be dispensed with.

Having thus described my invention, what I claim as new, and desire to secure by Letters Patent, is—

1. The combination with a tube or pipe section, of a rotary plug-valve controlling the passage of the fluid therethrough, an armature slidable longitudinally of the tube or pipe section, a spring for retracting the armature, means for turning the plug-valve from the armature on the movement thereof, and a solenoid surrounding the armature, the valve and the tube or pipe section.

2. The combination with a tube or pipe section, of a rotary plug-valve controlling the passage of the fluid therethrough, an armature slidable longitudinally of the tube or pipe section and having a cut-out portion, means on the valve whereby it can be turned step by step, a device on the pipe-section to prevent backward rotation of the valve, said device and turning means on the valve being located in the opening of the armature, means on the armature adapted to engage the turning means on the valve when the armature is moved in one direction and to disengage from said valve-turning means when the armature is moved in the opposite direction, a spring for moving the armature in one direction, and a solenoid surrounding the tube or pipe section and the armature and valve, adapted for attracting the armature.

3. The combination with a tube or pipe section, of a rotary plug-valve controlling the fluid-passage therethrough, a ratchet-wheel secured on said plug-valve, a dog pivoted to the tube or pipe section adapted to engage the ratchet-wheel and prevent backward turning of the plug-valve, a tubular armature slidable longitudinally of the tube or pipe section and having an opening which receives the ratchet-wheel and dog, a spring-pressed pawl carried by the armature adapted to engage the teeth of the ratchet-wheel when the armature is moved in one direction and to ride idly on the ratchet-wheel when the armature is moved in the opposite direction, a spring for moving the armature in one direction, and a solenoid inclosing the tube or pipe section, the valve and the armature, which is adapted for attracting the armature.

4. The combination with a rotary valve, of a ratchet-wheel thereon for turning the valve, an armature, an electromagnet for operating the armature, a tooth carried by the armature to engage the ratchet-wheel and turn it and the valve, and a locking-tooth carried by the armature adapted to engage the teeth of the ratchet-wheel after the valve has been turned to a predetermined position to thereby prevent further accidental turning of the valve.

5. The combination with a rotary valve and a ratchet-wheel thereon for turning the valve, of an armature, an electromagnet for operating the armature, a pawl carried by the armature having a tooth to engage the ratchet-wheel and turn it and the valve and also provided with another tooth spaced apart from the tooth aforesaid which is thereafter adapted to engage the ratchet-wheel and prevent further accidental turning thereof.

6. The combination with a tube or pipe section, of a valve controlling the passage of the fluid therethrough, an armature for operating the valve, an electromagnet on the tube or pipe section for controlling the armature, and means to take off leakage of water from the valve, comprising ports extending through the tube or pipe section from the exterior to the interior thereof.

7. The combination with a tube or pipe section, of a valve controlling the passage of the fluid therethrough, an armature for operating the valve, an electromagnet on the tube or pipe section for controlling the armature, means to take off leakage of water from the valve, comprising ports extending through the tube or pipe section from the exterior to the interior thereof, and a groove in the exterior of the tube or pipe section which communicates with said ports.

8. The combination with a tube or pipe section and a valve controlling the passage of fluid therethrough, of an armature slidable on the tube or pipe section and adapted for operating the valve, a tube or shell inclosing the armature, packing interposed between the tube or shell and the tube or pipe section on opposite sides of the valve, and a coil or solenoid on the said tube or shell which is adapted for operating the armature.

9. The combination with a tube or pipe section, of a valve controlling the passage of the fluid therethrough, an armature slidable longitudinally of the tube or pipe section, means for operating the valve on the movement of the armature, and a solenoid surrounding the armature, the valve, and the tube or pipe section.

10. The combination with a tube or pipe section, of a valve controlling the fluid-passage therethrough, a ratchet-wheel for operating said valve, a dog adapted to engage the ratchet-wheel and prevent backward turning thereof, an armature slidable longitudinally of the tube or pipe section, a spring-pressed pawl carried by the armature adapted to engage the teeth of the ratchet-wheel when the armature is moved in one direction and to ride idly on the ratchet-wheel when the armature is moved in the opposite direction, a spring for moving the armature in one direction, and a solenoid inclosing the tube or pipe section, the valve, and the armature and which is adapted for attracting the armature.

11. The combination with a valve, of a ratchet-wheel for operating the valve, a movable operating member, a tooth carried by the operating member engageable with the ratchet-wheel for turning said wheel to operate the valve, and a locking-tooth carried by the operating member adapted to engage the teeth of the ratchet-wheel after the valve has been predeterminedly positioned to thereby prevent further accidental operation of the valve.

12. The combination with a valve, of a ratchet-wheel for operating the valve, an operating member, a pawl carried by the operating member having a tooth to engage the ratchet-wheel and turn said wheel to operate the valve and also provided with another tooth spaced apart from the tooth aforesaid which is thereafter adapted to engage the ratchet-wheel and prevent further accidental turning thereof.

13. In an electromagnetic valve, the combination with a valve-casing, of a valve-seat therein, a valve for said seat, an armature slidable in relation to the valve-casing and adapted for operating the valve, a removable shell slidable endwise on and off the valve-casing and which encircles the armature, a solenoid carried by said shell and surrounding it, and means for holding the solenoid and shell on the valve-casing.

14. In an electromagnetic valve, the combination with a valve-casing, of a valve-seat therein, a valve for said seat, an armature slidable in relation to the valve-casing and adapted for operating the valve, a removable shell slidable endwise on and off the valve-casing and which encircles the armature, a solenoid carried by said shell and surrounding it, and removable nuts for engaging opposite ends of the valve-casing and opposite ends of the solenoid and holding the solenoid and shell on said valve-casing.

In testimony whereof I have signed my name to this specification in the presence of two subscribing witnesses.

ISAAC G. WATERMAN.

Witnesses:
ELMER SEAVEY,
WALLACE R. SEAVEY.